June 7, 1932. A. STOLL 1,861,889
METHOD AND APPARATUS FOR COUPLING NUTS AND WASHERS
Filed June 6, 1930 4 Sheets-Sheet 1
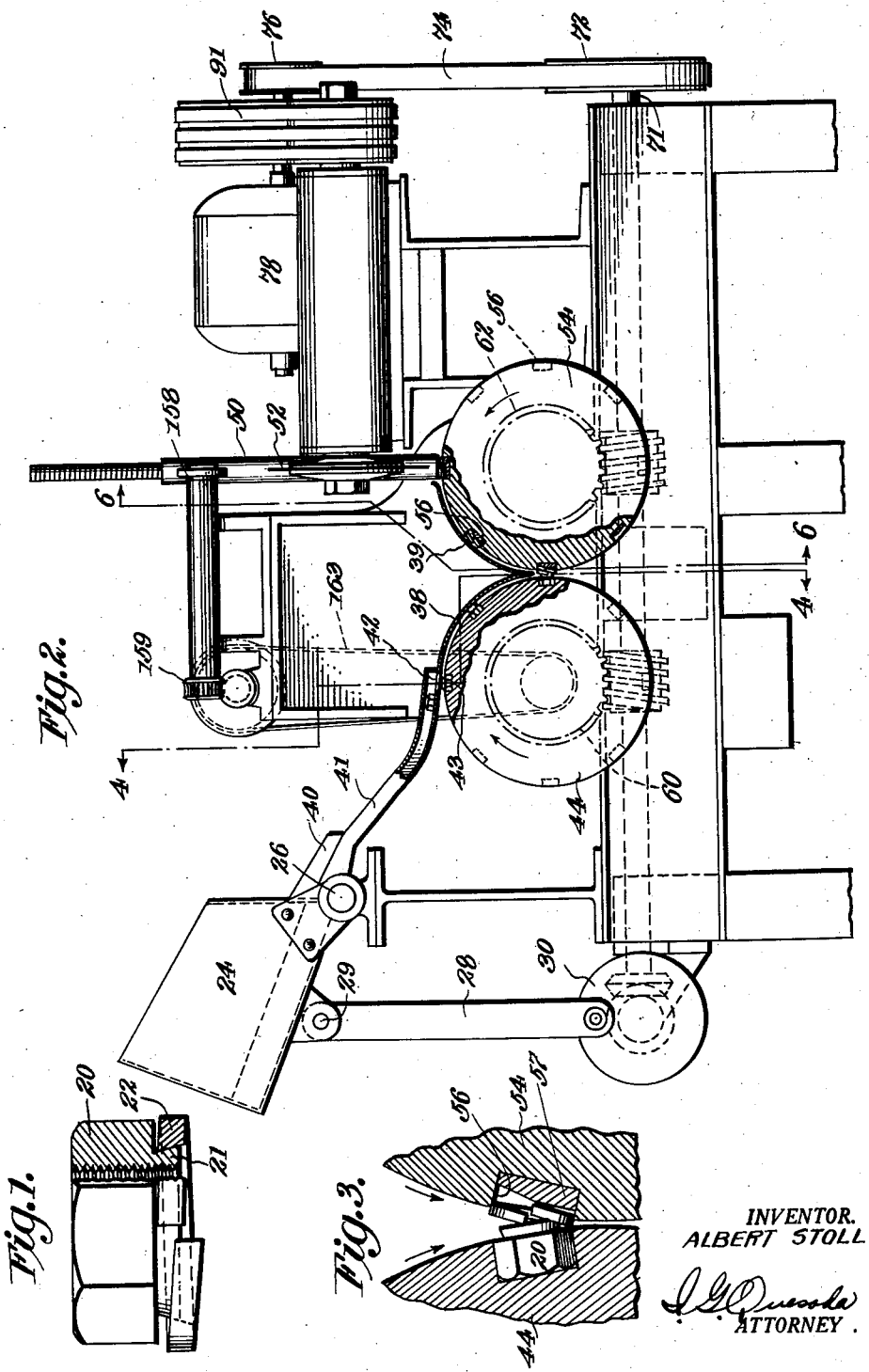
INVENTOR.
ALBERT STOLL
ATTORNEY.

June 7, 1932. A. STOLL 1,861,889
METHOD AND APPARATUS FOR COUPLING NUTS AND WASHERS
Filed June 6, 1930 4 Sheets-Sheet 2
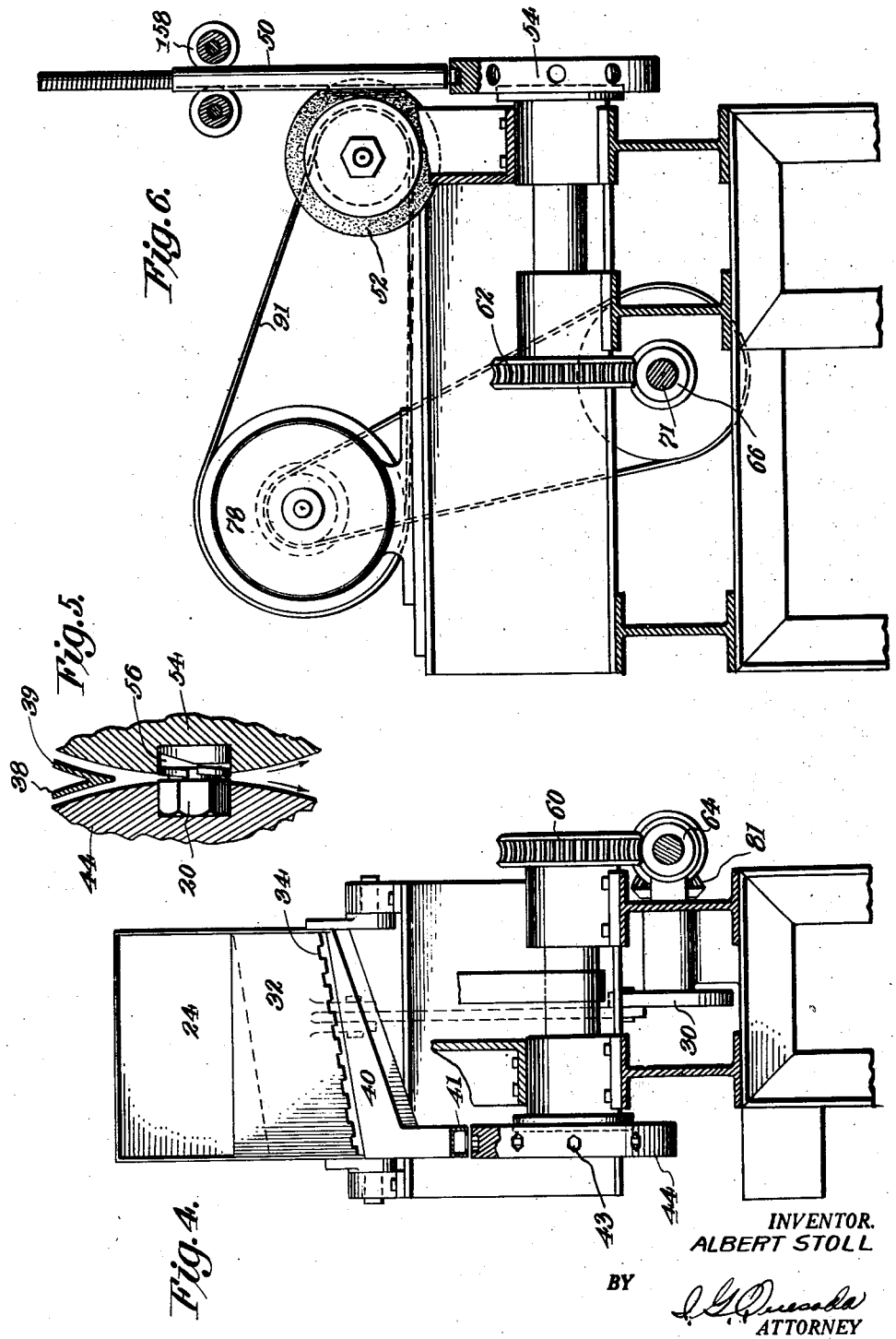
INVENTOR.
ALBERT STOLL
BY
ATTORNEY

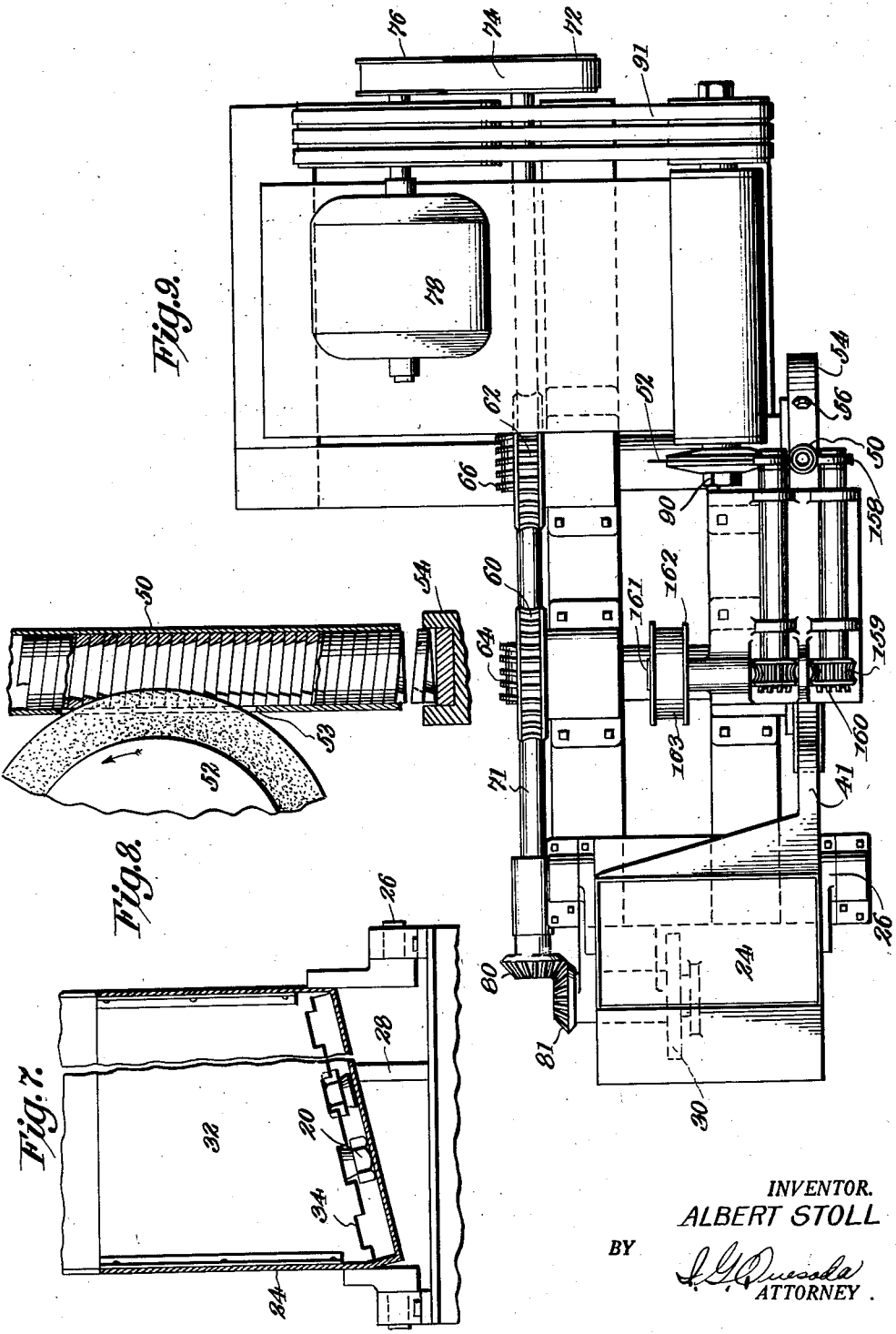

June 7, 1932. A. STOLL 1,861,889
METHOD AND APPARATUS FOR COUPLING NUTS AND WASHERS
Filed June 6, 1930 4 Sheets-Sheet 4
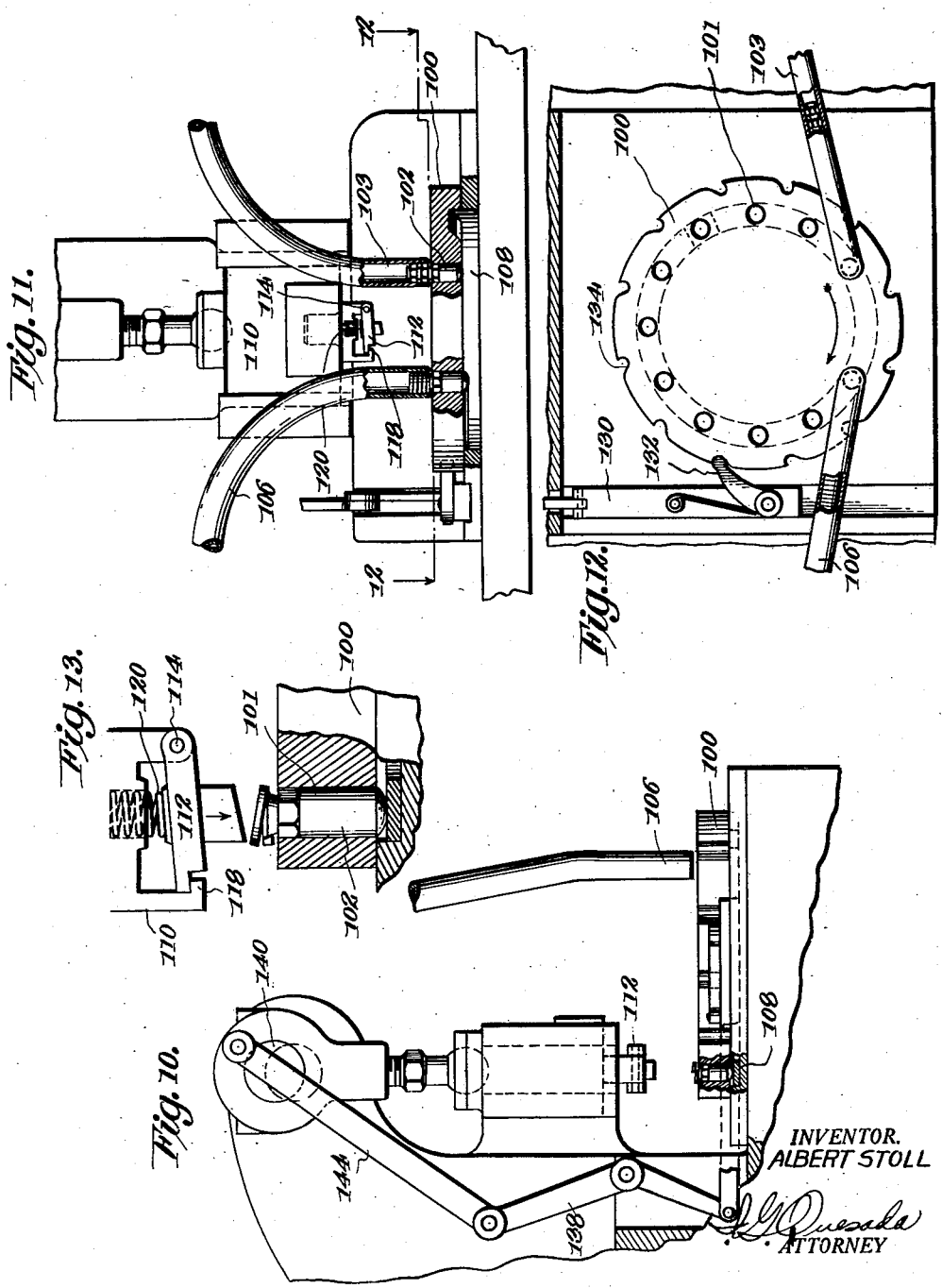
INVENTOR.
ALBERT STOLL
ATTORNEY Patented June 7, 1932

1,861,889

UNITED STATES PATENT OFFICE

ALBERT STOLL, OF DETROIT, MICHIGAN, ASSIGNOR TO NATIONAL MACHINE PRODUCTS COMPANY, OF DETROIT, MICHIGAN, A CORPORATION OF MICHIGAN

METHOD AND APPARATUS FOR COUPLING NUTS AND WASHERS

Application filed June 6, 1930. Serial No. 459,468.

This invention relates to a method and apparatus for coupling nuts and washers.

An important object of the invention is to provide a simple and efficient means by which lock washers may be coupled to especially designed nuts to allow these parts to be handled as a unit. In more specifically adverting to this feature of the invention, it might be pointed out that, in the practice of the invention, each washer is brought to a tangency with the nut to which it is to be coupled to establish an initial interlocking connection between an annular protuberance of the nut and the inner wall of the washer so that by the subsequent application of endwise pressure to the nut and the washer the washer is spread from the inner side thereof and is slipped over the protuberance to closely embrace the same with the result that the washer is firmly coupled to the nut and will remain firmly in place while being handled.

Another attribute of the invention will be found to reside in the provision of expeditious means by which a tubular body of helically wound stock may be cut lengthwise to define individual spring lock washers that are subsequently coupled to the nuts, the washer making means forming a part of the organization by which the desired coupling of the washers and the nuts is accomplished.

Other objects and advantages will be apparent during the course of the following description.

In the accompanying drawings forming a part of this application and in which like numerals are employed to designate like parts throughout the same, Figure 1 is a fragmentary side elevation illustrating a nut and washer coupled in accordance with this invention, parts being broken away, Figure 2 is a fragmentary side elevation of the washer and nut coupling mechanism and the washer making assembly, parts being shown in section, Figure 3 is a detail sectional view illustrating the means by which the nuts and washers are, when brought to a tangency, initially interlocked by the annular protuberance of the nut so that by the subsequent application of endwise pressure to these parts the washer is spread radially by the protuberance to cause the washer to slip over the protuberance and closely embrace the same, Figure 4 is a vertical transverse sectional view taken on line 4—4 of Figure 2, the view being taken in the direction of the arrows, Figure 5 is a detail sectional view illustrating the means by which the coupling of the washers and the nuts is completed, Figure 6 is a vertical transverse sectional view taken on line 6—6 of Figure 2, Figure 7 is a detail transverse sectional view illustrating the means by which the nuts are discharged from the hopper therefor with the protuberances thereof presented outward for subsequent connection with the washers, Figure 8 is a detail transverse sectional view illustrating the means by which a tubular body of helically wound stock is cut lengthwise to define individual lock washers that are later presented to and are coupled to the nuts, Figure 9 is a plan view of the machine, Figure 10 is a detail side elevation illustrating a modified form of nut and washer coupling means, Figure 11 is a fragmentary side elevation taken at right angles to the showing in Figure 10, Figure 12 is a horizontal sectional view taken on line 12—12 of Figure 11, Figure 13 is a detail sectional view illustrating the means by which endwise pressure is applied to a previously associated nut and washer to couple these parts.

In the drawings, the numeral 20 designates a nut, the base of which is provided with an annular protuberance 21 defining a means by which an axially compressible split lock washer 22 may be coupled to the nut to allow these parts to be handled as a unit. The annular protuberance 21 is shown to be externally flared to underlie the inwardly tilted opposed wall of the washer 22 and thereby retain the washer firmly in place on the protuberance, it being noted in this connection that the normal minimum internal diameter of the washer is appreciably less than the maximum external diameter of the protuberance 21.

The annular protuberance 21 in addition to providing for the permanent coupling of the washer and the nut defines a means by which the washer and the nut may be initially interlocked when, as suggested in Figure 3, these parts are brought to a tangency so that by the subsequent application of endwise pressure to these parts, the protuberance will spread the washer from the inner side thereof and cause the washer to slip over and embrace the protuberance in which latter position it remains.

Attention might be invited to Figures 2, 4 and 7 illustrating a hopper 24 open at the top thereof for the reception of nuts. The hopper 24 is mounted at the outlet end thereof on a horizontally arranged pivot element 26 and has connection at a point spaced from the pivot element with a link 28. More specifically, the upper portion of the link 28 is connected to the hopper 24 through the medium of a horizontal pivot 29 arranged in spaced parallel relation to the pivot element 26 so that endwise movement of the link 28 will result in oscillation of the hopper and agitation of the nuts therein. The lower portion of the link 28 has connection with a crank 30 in the form of a disk.

As shown in Figures 4 and 7, the outlet end of the hopper is in the nature of a removable gate or wall 32 having the lower edge portion thereof spaced above the bottom of the hopper and scalloped to define a plurality of more or less uniformly spaced recesses 34 of a width sufficient to allow only of the free passage of the protuberances 21 and not wide enough to allow of the passage of the bodies of the nuts. In this manner, it is necessary for the discharge of the nuts from the hopper that the same be positioned with the protuberances thereof presented outwardly.

The nuts thus discharged from the hopper are directed through what might be said to be the header 40 of a chute or conveyor 41. Figure 2 illustrates that the lower portion of the chute is provided in the bottom wall thereof with an opening 42 by which the nuts may leave the chute and enter the more or less uniformly spaced sockets 43 in the peripheral portion of a nut carrier 44. The nut carrier 44 is in the nature of a disk that is rotated in the direction indicated by the arrow associated therewith to conduct the nuts from the loading position to the coupling position.

Attention might now be invited to Figures 2 and 8 in which it is illustrated that a vertically arranged support or magazine 50 is adapted for the reception of a tubular body of helically wound stock from which individual helical axially compressible split washers are formed. The tubular body of helically wound stock in the magazine is cut lengthwise on a line parallel to the axis thereof or in a substantially radial line by a high speed cutting and abrading wheel 52, the peripheral portion of which is shown in Figure 8 to be extended through an opening 53 in the magazine for cutting and abrading engagement with the stock therein.

The effect of the engagement of the high speed wheel 52 with the stock within the magazine is to form individual lock washers, the ends of which are sharpened through contact with the wheel. Thus, the end portions of the washer are formed with stout and yet sharp teeth adapted to bite into the surfaces between which the washer is finally clamped. The magazine is shown to extend below the wheel 52 to hold the washers in axial alignment for successive feeding of the washers to a washer carrier 54 in the nature of a disk similar to the disk 44. More specifically, the disk 54 is provided in the peripheral portion thereof with a plurality of shallow uniformly spaced sockets 56 adapted to singly receive the washers from the magazine 50 and to conduct the same to a position where the same are coupled to the nuts. It is believed to be apparent that the element carriers 44 and 54 are rotated in opposite directions to bring the nuts and washers to a tangency as suggested in Figure 3 so that these parts may be permanently coupled.

Figures 3 and 5 illustrate that disk-shaped members 57 are secured within the sockets 56 and that the outer surfaces of such members have what might be said to be the trailing portions thereof relieved so that, when the coupled washers and nuts pass the horizontal center line, there will be no tendency for the washers to ease off the protuberances of the nuts.

In Figure 3, it is illustrated that when the washer is brought to a tangency with the base of the nut, the flared protuberance 21 will have a sort of interlocking engagement with the lower portion of the washer so that as a result of further rotation of the disks 44 and 54, the washer will be spread from the inner side thereof and will be slipped over the protuberance and permanently coupled to the same. As the sockets 43 and 56 move out of registration, the coupled nuts and washers will be free to drop into a suitable receiver located below. Arcuate guards 38 and 39 are extended about the peripheral portions of the carriers 44 and 54, respectively, between the loading and coupling positions to hold the elements carried by the carriers in place.

The element carriers 44 and 54 have connection with worm wheels 60 and 62 which, as shown in Figures 4 and 6, have connection with worm wheels 64 and 66, respectively.

The worm wheels 64 and 66 are, in turn, mounted on a motion-transmitting shaft 71 on one end of which there is located a pulley 72. A belt 74 is trained about the pulley 72 and about a second pulley 76 on the shaft of a source of power 78 in the nature of an electric motor or the like.

As shown in Figure 9, one end of the shaft 71 has driving engagement with the crank 30 through the medium of bevelled gears 80 and 81, the gear 81 being mounted on the shaft 71, while the gear 81 is mounted on the shaft to which the crank 30 is connected.

Figure 9 also illustrates that the high speed cutting and abrading wheel 52 is mounted on a shaft 90 operatively connected to the source of power 78 through a motion-transmitting mechanism 91. The cutting and abrading wheel 52 is of a type commercially available and contains an abrasive such as carborundum to cut through the adjacent side of the tubular body of stock in the magazine 50. It has been found that the wheel cuts with ease through the tempered stock from which the washers are made, and in this connection, it will be observed that the apparatus herein disclosed contemplates the tempering of the washer material before the same is furnished to the magazine.

Suitable means such as friction rollers 158 may be employed to advance the washer material through the magazine. The rollers 158 are shown to extend through oppositely located openings in the magazine and have operative connection through appropriate shafts with worm wheels 159 which are, in turn, in mesh with the worms 160 on a shaft 161.

Figure 9 illustrates that the shaft 161 carries a pulley 162 about which a motion transmitting belt 163 is trained. Referring now to Figure 2 it will be seen that the belt 163 is trained about a suitable pulley on the shaft of the carrier 44. Thus, rotation of the carrier 44 will bring about rotation of the feed rollers 158 in the proper direction to advance the washer material to the cutting disk 58.

In the form of invention illustrated in Figures 10 to 13, inclusive, an index table 100 is mounted for rotation about a vertical axis and is provided with an annular series of sockets or openings 101 receiving endwise movable work supporting pins 102.

As shown in Figures 11 and 12, the rotation of the index table 100 brings the openings 101 successively beneath the discharge end of a nut magazine or conductor 103 to affect the single delivery of the nuts to the openings. The rotation of the index table 100 also brings the openings 101 into registration with the outlet end of a washer magazine 106 so that washers are thereby brought into association with the nuts previously introduced into the openings.

The work supporting pins 102 positioned within the openings 101 ride on an annular cam 108 which, as shown in Figure 11, has the contact surface thereof depressed beginning with the washer loading position and extending to the nut and washer ejecting position.

After the initial association of the washers and nuts, the same are conveyed by the continued turning of the index table 101 to the coupling position immediately beneath the vertically movable ram 110. The ram 110 is shown to be provided with an assembly punch 112 horizontally hinged at one end to the ram as indicated at 114.

The other end of the punch 112 is formed with a sort of extension cooperating with a lug 118 in limiting downward and outward pivotal movement of the punch under the influence of the expansion spring 120. It is believed to be apparent from Figure 11 that when the ram 110 is moved downward, the angularly disposed contact surface of the pendent portion of the punch 112 is brought into pressure engagement with the washer to force the same over the protuberance of the nut whereby the nut and the washer are permanently coupled. After the coupling operation, rotation of the index table 100 is resumed to conduct the coupled nuts and washers from the coupling position to the ejecting position where, as shown in Figures 11 and 12, the cam has the contact surface thereof raised to discharge the coupled nuts and washers from the openings 101. After passing the ejecting position, the work supporting pins 102 will again come to a position beneath the magazine 103. Of course, the upper contact surface of the annular cam 108 is low enough to allow the work supporting pins 102 to assume a position below the level of the surface of the table 100 and in this manner shallow sockets are formed for the reception of the nuts.

Intermittent rotation of the table 100 is accomplished through a longitudinally movable feed bar 130 having a spring actuated pawl 132 adapted to successively extend into notches 134 in the peripheral portion of the table 100.

Intermittent endwise movement of the bar 130 is brought about through its connection with the bell crank 138 which is operatively connected with the crank shaft 140 of the bell crank through the intervention of a link 144.

Clearly, operation of the crank shaft 140 will serve to rock the bell crank 138 to bring about an intermittent advance of the table 100 and, of course, between periods of advancement or turning of the table 100, the ram 110 is brought down into pressure engagement with the washer below to couple the washer to the associated nut. After the coupling operation, turning of the table is resumed with the result that the endwise movable pin is brought into engagement with a raised portion of the cam 108 and the pin moved upward to eject the coupled nut and washer located above.

Having thus described the invention, what is claimed is:

1. In a mechanism for coupling washers and nuts through the medium of protuberances of the nuts, a rotary index table having an annular series of openings adapted for the reception of nuts and washers, work supporting means movable endwise in said openings, means to feed nuts to said openings, means to furnish washers to the protuberances of the nuts, and a ram to force the washers over the protuberances.

2. In a mechanism for coupling washers and nuts through the medium of protuberances of the nuts, a rotary index table having an annular series of openings adapted for the reception of nuts and work supporting means movable endwise in said openings, means to feed nuts to said openings, means to furnish washers to the protuberances of the nuts, a ram to force the washers over the protuberances, and a cam to move the work supporting means endwise to cause the work supporting means to eject the coupled nuts and washers.

3. In a mechanism for coupling washers to nuts through the medium of protuberances of the nuts, a rotary index table having an annular series of openings, work supporting means movable endwise in said openings, means to furnish nuts to the openings, means to furnish washers to the protuberances of the nuts, and a ram having a punch to engage the washers and force the same into embracing engagement with the protuberances of the nuts.

4. In a mechanism for coupling washers to nuts through the medium of protuberances of the nuts, a rotary index table having an annular series of openings, work supporting means movable endwise in said openings, means to furnish nuts to the openings, means to furnish washers to the protuberances of the nuts, a ram having a punch to engage the washers and force the same into embracing engagement with the protuberances of the nuts.

5. In a mechanism for coupling washers to nuts through the medium of protuberances of the nuts, a rotary index table provided with an annular series of nut holding means, means to present washers to the protuberances of the nuts, a ram having a yieldingly advanced punch to urge the washers into interlocking engagement with the protuberances of the nut, and ejecting means for the nuts.

6. In a mechanism for coupling washers to nuts through the medium of protuberances of the nuts, a rotary index table provided with an annular series of nut holding means, means to present washers to the protuberances of the nuts, a ram having a yieldingly advanced punch to urge the washers into interlocking engagement with the protuberances of the nut, and ejecting means for the nuts, said punch being provided with a contact face initially at an angle to the plane of the table.

7. In a mechanism for coupling nuts and washers through the medium of protuberances of the nuts, a nut support, means to present washers to the protuberances of the nuts, and a punch having a contact face initially at an angle to the opposed surface of the nut and adapted to engage the washer to force the same into embracing engagement with the protuberance.

In testimony whereof I affix my signature.

ALBERT STOLL.